United States Patent [19]

Moore et al.

[11] Patent Number: 5,001,969
[45] Date of Patent: Mar. 26, 1991

[54] AUTOMATIC DRIP COFFEE MAKER

[75] Inventors: Joseph F. Moore; Clinton E. Piland, both of Richmond, Va.

[73] Assignee: Proctor-Silex, Inc., Glen Allen, Va.

[21] Appl. No.: 538,374

[22] Filed: Jun. 15, 1990

Related U.S. Application Data

[63] Continuation of Ser. No. 468,401, Jan. 22, 1990, abandoned.

[51] Int. Cl.[5] .......................... A47J 31/52; H05B 1/02
[52] U.S. Cl. ......................................... 99/282; 99/283; 219/492
[58] Field of Search ................... 99/280, 281, 282, 283, 99/295, 299, 304, 307, 279; 219/492, 493, 491, 494, 497, 501, 507; 368/10, 9

[56] References Cited

U.S. PATENT DOCUMENTS

| | | | |
|---|---|---|---|
| 4,069,750 | 1/1978 | Kemp | 99/280 |
| 4,330,702 | 5/1982 | Cheng | 99/281 |
| 4,406,217 | 9/1983 | Oota . | |
| 4,412,481 | 11/1983 | Oota | 99/280 |
| 4,468,406 | 8/1984 | d'Alayer de Costemore d'Arc . | |
| 4,566,802 | 1/1986 | Kochler . | |
| 4,671,668 | 1/1986 | Narita . | |
| 4,725,714 | 2/1988 | Naya | 219/493 |
| 4,838,152 | 6/1989 | Kubicko . | |

Primary Examiner—Robert W. Jenkins
Attorney, Agent, or Firm—Roger S. Dybvig

[57] ABSTRACT

An automatic drip coffee maker (10) includes a timer circuit (42) for providing a preselected "start" time of day at which an activation/deactivation circuit (40) will activate the automatic drip coffee maker and a "stop" time of day, independent of said start time of day at which the activation/deactivation circuit (40) will deactivate the automatic drip coffee maker and prevent further reactivation thereof. A "next-day-reset" switch (58) allows manual resetting so that the activation/deactivation repeats the start/stop cycle at the same preselected "start", "stop" times of day on the next day. An auto access button allows creation of an artificial start signal for initiating the cycle immediately.

6 Claims, 3 Drawing Sheets

AUTOMATIC DRIP COFFEE MAKER

BACKGROUND OF THE INVENTION

This is a continuation of U.S. application Ser. No. 07/468,401 filed Jan. 22, 1990, now abandoned.

This invention relates generally to the art of automatic drip coffee makers, and more particularly to safety features for such automatic drip coffee makers.

Automatic drip coffee makers have become increasingly popular in recent years. Such coffee makers generally include C-shaped frames for holding coffee baskets above coffee pots. Filter paper and coffee are held in the coffee baskets while heated water from water storage containers built into the frames is dripped over the coffee baskets. When this heated water passes through the coffee and filters into the coffee pots it picks up coffee traces to become freshly brewed coffee which is maintained hot by heating elements mounted on the frames below the coffee pots.

It is possible to plug such an automatic drip coffee maker into a timer which supplies power to the automatic drip coffee maker during particular times of the day, so that, for example, coffee is ready at a particular time of day or to merely cause the coffee maker to be shut off within a predetermined period of time, for example after two (2) hours. A difficulty with use of such a timer which turns on and off at particular times each day is that once it is set it will energize the coffee maker during these particular times each day thereafter, even though on some days the coffee maker may not have been prepared for making coffee with water in the water storage container and coffee in the basket. It can be dangerous to energize a heating element of such a coffee maker if there is no water to heat. Thus, it is an object of this invention to provide a coffee maker which can be set to be energized at particular times of day but for which there is little or no chance that it will be energized when it is not properly prepared for brewing coffee.

A difficulty encountered when using a timer which merely turns off the coffee maker after a predetermined period of time is that one must usually activate it to turn on the coffee maker, which means that one must wait for the coffee to brew before a cup of coffee is available. Therefore, it is an object of this invention to provide a coffee maker which not only automatically turns off after a particular time period, but which also automatically turns on at a particular time, and yet for which there is little or no chance that it will be energized without first being properly prepared therefor.

It is also an object of this invention to provide a timer for an automatic drip coffee maker which is easy to install and utilize.

In U.S. Pat. No. 4,069,750, Kemp suggests an automatic drip coffee maker with a timer built therein. However, again, this timer appears to control either the start of coffee brewing at a particular time and/or to shut off the coffee maker within a predetermined period of time each day and, as such, Kemp's coffee pot could be energized when it is not set up with water and coffee for brewing. Thus, again, it is an object of this invention to provide an automatic drip coffee maker which automatically turns on and off at particular times of day but which is not likely to be energized when it is not "set up" to be energized.

Also, it is an object of this invention to provide an automatic drip coffee maker which can be turned on at any time of day but which automatically turns off at any preset time of day independent of the turning on time, the coffee maker not being thereafter automatically started up unless being started up manually or reset to start up at a particular time of day.

SUMMARY

According to principles of this invention, an automatic drip coffee maker includes an electric circuit mounted in a frame with a timer and an activation/deactivation device. The timer provides preselected start and stop timing outputs while the activation/deactivation device responds to the start and stop outputs by automatically energizing and deenergizing a heating element and also by not allowing reenergization of the heating element unless the activation/deactivation device is manually reset. The electronic circuit includes a "next-day-reset" switch which allows one to reset the circuit to automatically activate and deactivate the heating element the next day at the previously set starting and stopping times. An automatic access button allows creation of an artificial start signal for initiating a start/stop cycle immediately.

BRIEF DESCRIPTION OF THE DRAWINGS

The foregoing and other objects, features and advantages of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating principles of the invention in a clear manner.

DETAILED DESCRIPTION OF THE PREFERRED EMBODIMENT

Figure 1:
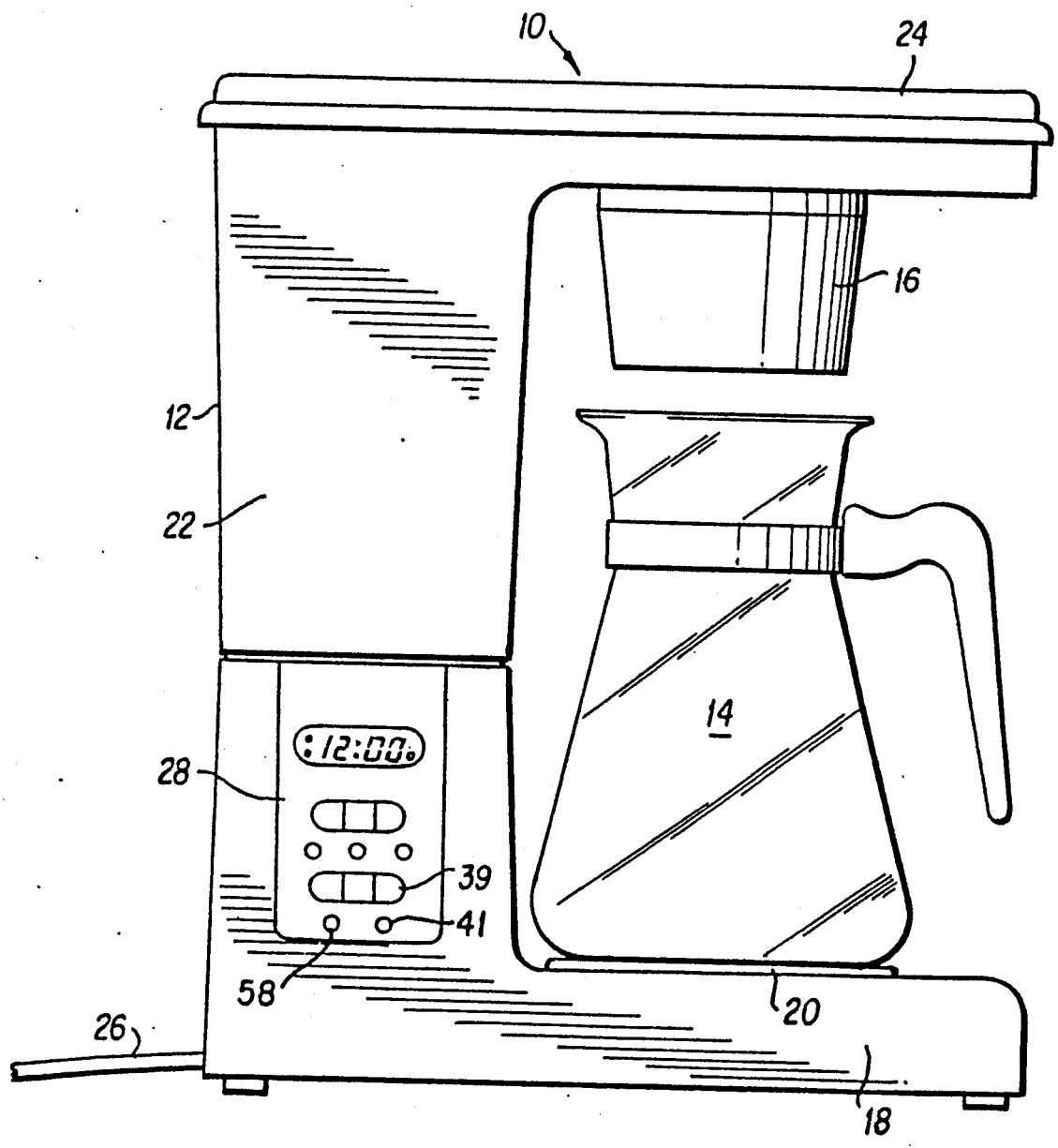
FIG. 1 is a side view of an automatic drip coffee maker according to principles of this invention.

An automatic drip coffee maker 10 comprises a frame assembly 12, a coffee carafe 14, and a coffee brew basket 16.

The frame assembly 12 includes therewith a floor 18 having a warming plate 20 heated by a heating element or coil 30 (see FIG. 2A) thereon for receiving the carafe 14, a vertical pedestal 22, and an overhang 24 located above the floor 18. The frame assembly 12 includes a water storage tank (not shown) located mainly in the pedestal 22, a water flow line (not shown) extending from the water storage tank through an area near the heating element 30 to above the coffee brew basket 16, and a pump driven by heat in the water flow line near the heating element 30. In this respect, the automatic drip coffee maker 10 of this invention functions generally the same as prior art automatic drip coffee makers in that an empty carafe 14 is placed on the warming plate 20, coffee is placed in a filter in the coffee brew basket 16, and water is placed in the water storage tank. Electrical energy is supplied via a supply cord 26 to heat the warming plate 20 via the heating element 30. Heat from the heating element 30 is also used to energize the heat-driven pump, heating water passing therethrough and producing energy for causing the water to pass therethrough. Thus, heated water is driven from the water storage tank and caused to drip into the coffee brew basket 16. This heated dripping water passes through the coffee and the filter in the coffee brew basket 16 and falls into the carafe 14 as brewed coffee.

An electronic control circuit 28 is part of the frame assembly 12 and controls operation of the automatic drip coffee maker 10. This circuit, including the heating element 30, is shown in more detail in FIGS. 2A and 2B.

Figure 2A:
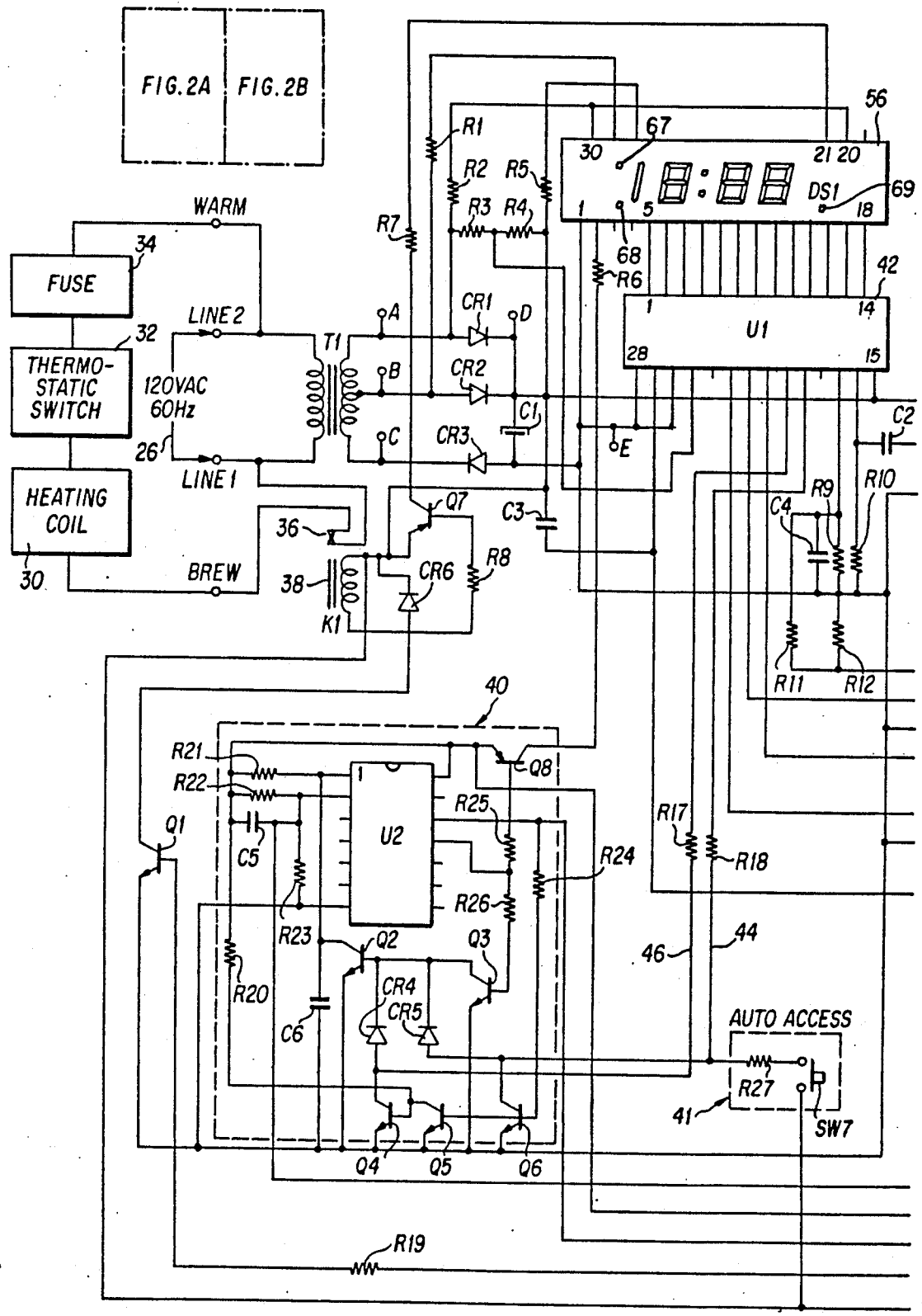
FIG. 2A is a left-hand portion of a partially-block, partially-schematic diagram of an electric circuit of the automatic drip coffee maker of FIG. 1.

The heating element or coil 30 of the circuit shown in FIG. 2A provides heat for the warming plate 20 and for driving the heat-driven pump (not shown) to cause heated water to be dripped from the storage tank (not shown) into the brew basket 16. A thermostatic switch 32 maintains the temperature of the heating coil 30 near a particular temperature and a thermal fuse 34 shuts down the heating coil in case of an overheating malfunction. The heating coil 30, the thermostatic switch 32, and the fuse 34 are connected across lines 1 and 2 of the supply cord 26 in series with an on/off relay comprising a relay switch 36 driven by a relay coil 38. The relay coil 38, in turn, is steered by a transistor $Q_1$, which, when it transmits, connects one side of the relay coil 38 to ground, thereby allowing current to flow through the relay coil 38 and closing the relay switch 36 to activate the heating coil 30. A main switch 39 can be placed in an "off" position in which the steering transistor $Q_1$ is not biased to transmit and the heating coil 30 is, therefore, not activated; in an "on" position in which the steering transistor $Q_1$ is saturated, and thereby transmitting, so that the heating coil 30 is continually energized through the relay switch 36; in an "automatic" position in which the steering transistor $Q_1$ is energized only at a particular starting time and deenergized at a particular stopping time as is directed by a relay activation/deactivation circuit 40; and finally, in a semi-automatic position in which the steering transistor $Q_1$ is energized by a circuit 62 through an output 66 for a time interval selected by a switch 64 (as will be described in more detail below).

An integrated circuit 42, or UI, of a type used in a digital radio clock with dual alarm, is a type 3459, with a preferred embodiment available from Texas Instruments having a designation of TMS 3459 BNL IC, which provides a timed start output signal at any preselected time of day on a start output line 44 and a timed stop output signal at any preselected time of day on a stop output line 46. The timing driver integrated circuit 42 can be "set" utilizing an "auto set" switch 48 in conjunction with either a respective, "fast", or "slow", switch 50, or 52 in combination with a setting switch 54. In this respect, in order to set the timing driver integrated circuit 42 to provide a proper time-of-day reading on a display 56, the setting switch 54 is switched to contact "time" and the "auto set" switch 48 and an appropriate "fast" or "slow" switch 50 or 52 are pressed together to drive the timing driver integrated circuit 42 to a proper time-of-day as read on the display 56. The display 56 is an integrated circuit type 1008, with a preferred embodiment thereof being available from Sanyo having a complete designation of SL-1008-26T LED DISPLAY. To set a time of day at which a "start" output signal appears on the "start" output line 44, the setting switch 54 is switched to the "start" terminal and the appropriate auto-set switch 48 and fast or slow switches 50 or 52 are depressed until the starting time of day can be read from the display 56. To independently set the time of day at which a "stop" output signal will appear on the "stop" output line 46, the setting switch 54 is moved to the "stop" terminal and the auto set switch 48 and appropriate "fast", or "slow" switches 50 or 52 are depressed until the appropriate stop time of day can be read from the display 56. Once these settings are accomplished, the setting switch 54 is moved to the "time" terminal at which the display 56 again provides the time-of-day. It should be noted that the start and stop times of day are chosen independently of one another.

The "heart" of the relay activation/deactivation circuit 40 is a ripple counter U2 formed by a binary counter integrated circuit type 4024, with one embodiment thereof being available from RCA with a designation of CD 4024BE. When the main switch 39 is in the "auto" position, the ripple counter U2 can be reset so that its outputs appearing at pins 11 and 12 are 0 volts by depressing a "next-day-reset" switch, or button, 58. In this state, a transistor $Q_6$ is off, so that the "start" output line 44 is not grounded, but $Q_4$ is on, or in saturation, thereby grounding out the "stop" output line 46. When a "start" output signal is applied to the "start" output line 44, transistor $Q_2$ becomes saturated and therefore transmits, thereby grounding out pin 1 of the ripple counter U2. The ripple counter U2 counts this ripple input and thereby causes its output pin 12 to go high while its pin 11 remains low. The high signal at pin 12 drives transistors $Q_5$, $Q_6$, and $Q_1$ into saturation. When transistor $Q_1$ is driven into saturation, and thereby transmits, it grounds out the ground side of the relay coil 38, thereby causing current through the relay coil 38 to drive relay switch 36 and switch on the heating coil 30 of the automatic drip coffee maker 10. But since the transistor $Q_6$ is now transmitting, the "start" output line 44 is grounded and any further "start" signals appearing thereon will be ineffective. The "stop" output line 46, on the other hand, is no longer grounded because when the transistor $Q_5$ transmits, the transistor $Q_4$ is opened. Thus, when the "stop" signal is received from the timing driver integrated circuit 42 on "stop" output line 46, the ripple counter U2 increments its output by one, so that its pin 12 goes low and its pin 11 now goes high. With pin 12 low, ransistor $Q_1$ cuts off, and the relay switch 36 cuts off, thereby deactivating the heating coil 30 and the automatic drip coffee maker 10 is effectively cut off. With pin 11 high, transistor $Q_3$ goes into saturation, thereby grounding out further inputs to pin 1 of the ripple counter U2 until the counter is again reset using the next-day-reset switch 58.

The automatic access button 41 allows one to immediately energize the heating coil 30 when the main switch 39 is in the automatic mode, even though the start time of the timing driver integrated circuit 42 has not been reached. Basically, by pressing the automatic access button 41 one provides a manual start signal on the start output line 44 from the hot side of the relay coil 38. Thus, if one presses the next-day-reset switch 58 to reset and then manually creates a start signal using the auto access button, the heating coil 30 will be energized immediately and remain on until the time integrated circuit 42 provides a stop signal on stop output line 46.

Figure 2B:
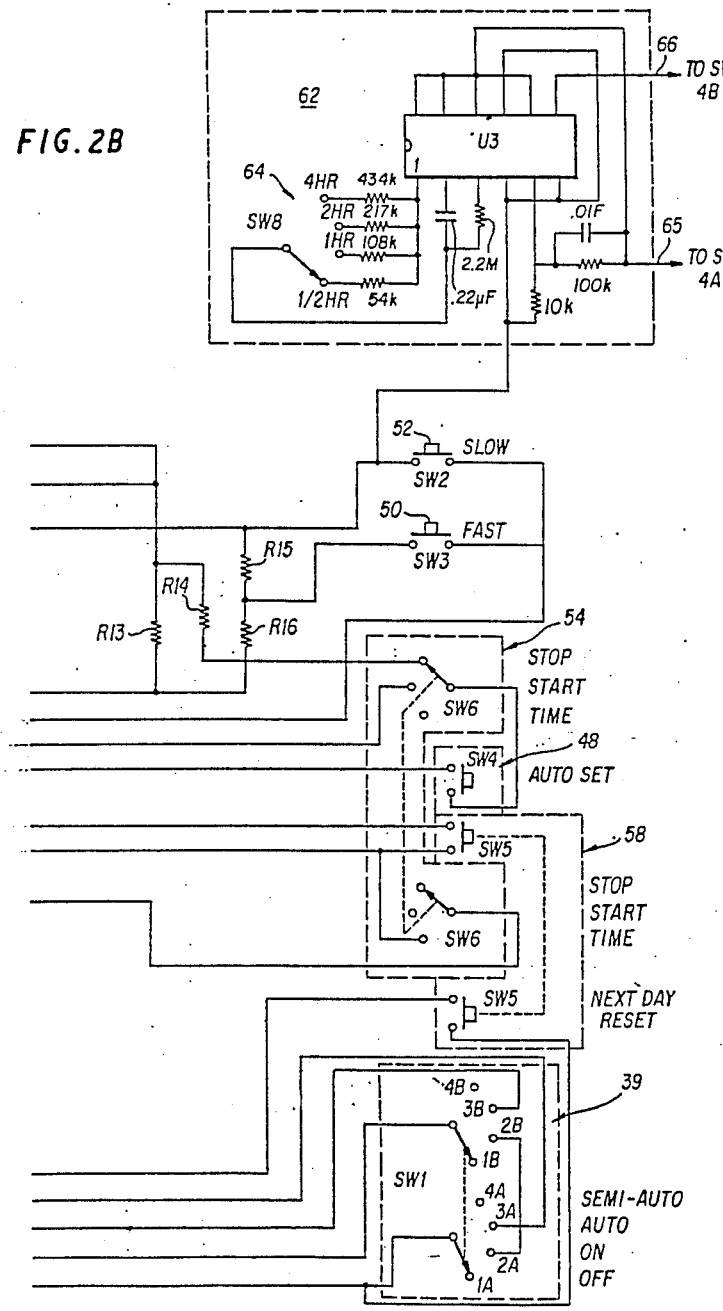
FIG. 2B is a right hand portion of the diagram of FIG. 2A.

If the main switch 39 is set in a semi-automatic position as can be seen in FIG. 2B, the energization of the heating coil 30 is then under the control of the timer 62. The timer has the mode switch 64 which can be set to ½ hour, 1 hour, etc. positions. When the main switch 39 is set in the semi-automatic position an integrated circuit U3 is reset via line 65 to provide a start output on the line 66 which is applied to the base of $Q_1$ for activating the relay coil 38 to energize the heating coil 30. At the end of a time period, as determined by the setting of mode switch 64, line 66 is deenergized and the heating coil 30 is turned off. The semi-automatic position of the main switch 39 provides a timing mode of operation which was practiced in the prior art, however, here it is combined with a circuit providing fully automated features including a next-day-reset switch. The integrated circuit U3 is an oscillator/divider type 4541, with one such IC being available from Motorola under the designation MC 14541B.

The elements of the schematic of FIGS. 2A and 2B are as follows:

| PART DESIGNATION | PART DESCRIPTION |
|---|---|
| SW2-SW4 | DOME PUSH SWITCH |
| SW1 | 4 POSITION SLIDE SWITCH DP |
| U1 | TMS 3459 BNL IC(TI) |
| U2 | CD 4024BE IC(RCA) |
| $DS_1$ | SL-1008-26T LED DISPLAY (SANYO) |
| R7 R6 | 1.5K Ω |
| SW5 | N.O.MOM. PUSH SWITCH |
| R16,R19,R14 | 6.8K Ω |
| R9,R8,R24 | 22K Ω |
| R5 | 150 Ω |
| $R_1,R_2$ | 10 Ω |
| C4 | 10 μF CAPACITOR |
| C1 | 470 MFD CAPACITOR |
| CR4-CR6 | IN4148 DIODE |
| CR1-CR3 | IN4001 DIODE |
| $Q_1$-$Q_6$ | MPS-3704 TRANSISTOR |
| $K_1$ | RELAY |
| $T_1$ | PI-33-102 TRANSFORMER |
| $T_1$(ALT.) | PI-28-106 TRANSFORMER |
| $Q_7$-$Q_8$ | MPS-3703 TRANSISTOR |
| U3 | MC 14541B (motorola) |
| R3 | 100K Ω |
| R4,R17,R18 | 200K Ω |
| R10 | 220K Ω |
| R11,R21,R22 | 22K Ω |
| R12,R13 | 10K Ω |
| R15 | 3.3K Ω |
| R20,R26,R27 | 47K Ω |
| R23 | 2.2K Ω |
| R25 | 22K Ω |
| C3 | .002 μF CERAMIC CAPACITOR |
| C2 | .047 μF MYLAR CAPACITOR |
| C5 | .1 μF CAPACITOR |
| C6 | 2.2 μF CAPACITOR |
| SW6 | 3 POS. SLIDE SWITCH |

In use, the electrical supply cord 26 of the automatic drip coffee maker 10 is plugged into a wall outlet and is used in a normal manner by leaving the main switch 39 in an "off" position when it is not desired to use the automatic drip coffee maker 10 but moving it to the "on" position when it is desired to make coffee with the automatic drip coffee maker 10 and maintain the coffee in a warm state. When it is desired to have coffee at a particular time the next day, the main switch 39 is placed in the "automatic" position, a filter and coffee are placed in the coffee brew basket 16, water is poured into the water supply tank of the frame assembly 12, and the "next-day-reset" switch 58 is depressed and released. Depression of the "next-day-reset" switch 58 zeros the outputs on the pins 11 and 12 of the ripple counter U2 so that transistor $Q_6$ is "off" and transistor $Q_4$ is on. In this state, the "start" output signal appearing on the "start" output line 44 drives the transistor $Q_2$ on, causing a ripple at pin 1 of the ripple counter U2, placing a "high" on pin 12 which, in turn, reverses the states of transistors $Q_4$ and $Q_6$ and turns the transistor $Q_1$ on to activate the heating coil 30. When the next timing signal is placed on the "start" and "stop" output lines 44 and 46, only the "stop" output signal appearing on "stop" output line 46 drives the transistor $Q_2$, thereby causing another ripple at the ripple counter U2 to make pin 12 go low and pin 11 go high. With pin 12 low, the steering transistor $Q_1$ is turned off, thereby deenergizing the heating coil 30 of the automatic drip coffee maker 10. In addition, the transistor $Q_3$ is saturated or conducting, so that the base of transistor $Q_2$ is now grounded out and can no longer be activated by timing inputs on either the "start" output line 44 or the "stop" output line 46. The relay activation/deactivation circuit 40 remains in this attitude until the "next-day-reset" switch 58 is depressed. Thus, one can prepare coffee for the next day, but if all of the coffee is not used, and no one turns the coffee maker off, it is automatically turned off at the "stop" time. It will not be turned on again the next day, unless one depresses the "next-day-reset" switch.

Should one forget to set up the coffee maker the day before, but yet wish for the coffee maker 10 to start making coffee immediately and to stop making coffee at the normal preselected time, he or she leaves the main switch 39 in the auto position and presses the next-day reset switch 58 to reset the timed solenoid activation circuit 40 with zero outputs at pins 11 and 12 of U2. The auto access button 41 is depressed to place an artificial start signal on line 44, to thereby start the above described cycle immediately. The coffee maker 10 begins making coffee immediately and stops making it when the timing driver integrated circuit 42 places a stop signal on the stop output line 46. Again, the coffee maker 10 will not start making coffee the next day unless the next-day reset switch is depressed. Should an operator wish to operate the coffee maker only for a specific length of time, regardless of the time of day, without disturbing the automatic predetermined start and stop times, he sets the main switch 39 on semi-automatic and the mode switch 64 on the length of time he desires to operate the coffee maker. The coffee maker will then operate for the specific period of time set with the mode switch 64 and cut off. To return to the automatic mode, one need only switch the main switch 39 to the auto position and depress the next-day reset switch 58.

When the transistor $Q_1$ energizes the relay coil 38, this activates transistor $Q_7$ to light an "on" indicator light 69 (LED) on the time display 56, thereby indicating that the heating coil 30 is activated so that coffee is being made and/or maintained warm.

An auto enabled indicator light 68 (LED) on the time display 56 is lit to indicate to a user that the coffee maker is in an automatic mode. The auto enabled indicator light 68 remains lit when the switch 39 is placed int he auto mode and the "next-day-reset" switch 58 is depressed until a stop signal is placed on the stop output line 46 by the integrated circuit 42. The auto enabled indicator light 68, when lit, let a user know:

1. If the ON indicator 69 is unlit, the coffee maker is armed, or ready for the next day.
2. If the ON indicator 69 is lit, the coffee maker is making and/or heating coffee, but will turn off automatically.

The auto enabled indicator light 68 works off the integrated circuit ripple counter U2. When pin 11 of U2 is low, $Q_8$ conducts, lighting the auto enabled indicator light 68. When the ripple counter U2 receives a stop signal on stop output line 46, the pin 11 goes high, as previously described, thereby switching transistor Q8 off and thereby switching the auto enabled indicator light 68 off. If the "next-day-reset" switch is depressed while the switch 39 is in the auto mode, the enabled indicator light 68 is again lit.

In the time display 56, a PM indicator light 67 (LED) is driven by the integrated circuit 42 to show if a displayed time is AM or PM.

It will be understood by those of ordinary skill in the art that many changes in form can be used while remaining within the spirit of the invention. Also, it should be appreciated that with this invention, one can set an automatic drip coffee maker to turn on immediately or at a specific start time of day the next day, and turn off at a specific stop time of day, independent of the start time, at the end of the next day as a safety feature. In this regard, by allowing the coffee maker to be set to turn off at a specific stop time of day independent of the start time a safety feature is provided in that while the coffee maker can be used to keep coffee warm throughout the day, and perhaps to even make several additional carafes of coffee throughout the day, it will still automatically turn off at the stop time of day. For example, the start time of day could be set to be 6:00 AM and the stop time of day could be set to be 6:00 PM. At 6:00 AM a carafe of coffee would be made and maintained warm until 6:00 PM at which time the coffee maker would automatically turn off to provide safety. If at 11:00 AM someone makes a fresh carafe of coffee, the automatic coffee maker will still turn off at the stop time of day to provide safety. Further, when the coffee maker turns on and off in one day, it does not turn on again the next day unless it is reset to do so. Finally, the coffee maker of this invention can be set to operate for a specific length of time only and then shut off without disturbing the automatic preselected start and stop times when placed in the semi-automatic mode.

The embodiments of the invention in which an exclusive property or privilege is claimed are defined as follows:

1. An automatic drip coffee maker comprising:
   a coffee maker frame;
   a coffee carafe separate from said frame, but mountable on said frame, for holding brewed coffee;
   a coffee brew basket attachable to said frame for holding a filter and coffee above said coffee carafe;
   a water storage container built into said frame for storing water;
   an electric energizing element means built into said frame for heating water in said storage container and causing the water to drip through the coffee and filter in said coffee brew basket into said coffee carafe as coffee and for thereafter heating said freshly brewed coffee in said carafe;
   an electric control circuit mounted in said frame, said electric control circuit comprising:
   a timer for providing start and stop timing outputs at respective preselected start and stop times of day, said timer including a setting means for selectively setting said preselected start and stop times of day independently of one another;
   activation/deactivation means coupled to said timer for responding to said start timing output signal by activating said electric energizing element means for heating any water in said storage container, causing said water to drip through said coffee and filter and maintaining resulting coffee in said coffee carafe hot, and for responding to said stop timing output signal by deactivating said electric energizing element means and thereafter preventing said electric energizing element means from further heating water in said storage container for causing said water in said storage container to drip on said coffee and filter and from maintaining said resulting coffee in said coffee pot hot in response to further start and stop timing outputs from said timer;
   whereby said automatic drip coffee maker can be set to make coffee in said coffee pot at any preselected starting time of day, to thereafter maintain said coffee in said coffee pot until any preselected stop time of day, and finally to be deenergized at said preselected stop time of day, not to be reactivated until being manually reset.

2. An automatic drip coffee maker as in claim 1, wherein said electric control circuit includes a manual next-day reset switch and wherein said activation/deactivation means does not respond to start timing output signals from said timer to reactivate said electric energizing element means unless said manual next-day reset switch is manually manipulated.

3. An automatic drip coffee maker as in claim 2, wherein said activation/deactivation means includes a ripple counter having two outputs, with a first output activating said electric energizing element means and a second output disabling said activation/deactivation means.

4. An automatic drip coffee maker as in claim 1, wherein said activation/deactivation means includes a ripple counter having two outputs, with a first output activating said electric energizing element means and a second output disabling said activation/deactivation means.

5. An automatic drip coffee maker as in claim 1, wherein said energizing element also maintains said carafe warm.

6. An automatic drip coffee maker as in claim 1, wherein is further included an auto-access switch for manually feeding a start timing output to said activation/deactivation means.

* * * * *